United States Patent Office 2,867,251
Patented Jan. 6, 1959

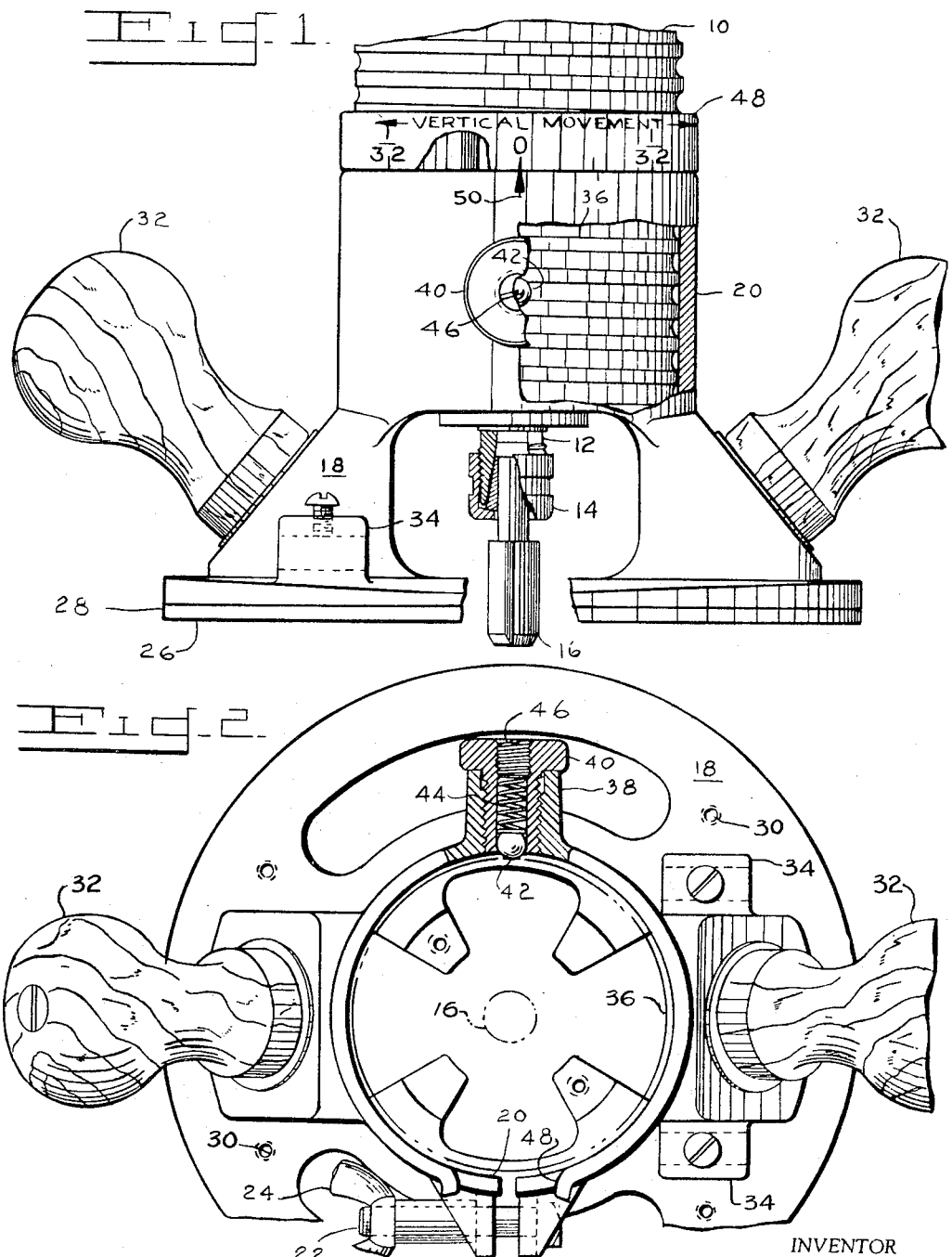

2,867,251

ROUTER DEPTH ADJUSTMENT MEANS

Whitfield Moretti, Millers Falls, and Leonard C. Pratt, Greenfield, Mass., assignors to Millers Falls Company, Greenfield, Mass., a corporation of Massachusetts Application May 21, 1957, Serial No. 660,632

5 Claims. (Cl. 144—134)

The present invention relates to power operated routers and more particularly to improved means for adjusting the depth of cut to be made by the router cutter.

Routers of the type herein dealt with are of well known construction comprising a motor housing which in use is usually vertically disposed. A base having a bottom workpiece engaging surface is mounted on the housing and a power cutter extends beneath the workpiece engaging surface. Means are usually provided for the relative adjustment between the cutter and said surface to vary the depth of cut.

In some instances this adjustment must be very fine and accurate as where a trial cut has been made and found to be a matter of one-sixty-fourth of an inch away from a desired depth. At other times considerable adjustment must be made as where the cutter has been previously set for a cut an eighth of an inch deep and it is desired to make a subsequent cut three-quarters of an inch deep. In the first case accuracy is of the greatest importance while speed and ease of adjustment is more desirable in the second case.

The principal object of this invention is to provide highly accurate fine depth adjusting means for a router cutter, which adjusting means may be rapidly shifted for making rough adjustments in a controlled manner.

Another object of the invention is to provide improved indicia means which are particularly adapted for use in combination with the adjusting means of the present invention.

The above and other related objects as well as the various novel features of the invention will be apparent from a reading of the following description of the disclosure found in the accompanying drawing.

In the drawing:

Fig. 1 is a view in elevation, with certain portions in section and others broken away of a router assembly embodying the present invention; and Fig. 2 is a plan view of the router base seen in Fig. 1.

The router as seen in Fig. 1 comprises a motor housing 10 having a power shaft 12 extending from its lower end. A chuck 14 is provided at the lowermost end of shaft 12 for mounting a routing cutter 16. A router base 18 is provided with an integral split sleeve 20 which is telescoped over the lower end of the housing 10 and which may be clamped thereto by means of a screw 22 (Fig. 2) which is held against rotation at one side of the split in the sleeve and a wing nut 24. Preferably the work engaging surface 26 of the base 18 takes the form of properly apertured disc 28 of plastic impregnated cloth, wood or other similar relatively soft material. The disc 28 is secured to the base 18 by means of countersunk screws (not shown) threaded into tapped holes 30 (Fig. 2). The router may be guided over a workpiece by hand grips 32 and held in spaced relation to a side of the workpiece by conventional guide means (not shown) secured in base lugs 34.

It will be apparent that the depth of cut made by the cutter 16 depends on the extent to which the sleeve 20 is telescoped over the housing 10. The following means permit not only accurate adjustment of depth of cut but rapid adjustment where a large adjustment is desired. These means include a screw thread 36 having a relative low helix angle formed on the lower exterior portion of the housing 10. The thread 36 may be economically formed in die casting the housing 10 without the necessity of any expensive machining operation. A boss 38 (Fig. 2) extends in radial fashion from the sleeve 20 and threadably receives a screw member 40. A ball 42 rides within a central bore in the screw 40 and is urged into cooperative engagement with the screw thread 36 by a spring 44 (see phantom showing of thread 36 in Fig. 2). The spring is confined at one end by a screw 46 and the ball 36 is confined in its bore by reason of the fact that the bore is swaged inwardly to prevent escape of the ball therefrom.

The above described arrangement is most convenient for adjusting the cutter 16 with respect to the workpiece engaging surface 26. With the wing nut 24 loosened the base 18 may be rotated relative to the housing 10, as the ball 42 rides along the screw thread 36 a fine accurate adjustment of the cutter position may be obtained. Where a larger adjustment is desired the base 18 may be slid axially of the housing, the spring 44 yielding to permit the ball 42 to ride over the screw thread 36. In view of this latter type adjustment it is preferable that the pitch of the thread 36 be some even fractional dimension as one-quarter of an inch. Thus where a cut had been previously made at an eighth of an inch and it is next desired to make a cut at three-eighths of an inch, the base 18 is slid upwardly of the housing 10 one thread length. The cutter 16 will then extend approximately three-eighths of an inch below the surface 26 and little or no fine adjustment will be required.

Indicia means are also provided to facilitate the making of fine adjustments. These means take the form of a garter-type spring 48 which embraces the housing 10 immediately above the base 18. Indicia marking incremental fractional portions of an inch may be provided on the spring 48 and matched against a pointer mark 50 formed at the upper end of sleeve 20.

Thus after the cutter 16 is adjusted for approximately the desired depth of cut, the spring 48 may be zeroed with respect to the pointer 50, the amount of fine adjustment needed may be determined by making a trial cut. Knowing this the base 18 may then be rotated relative to housing 10 (and spring 48) to match the pointer 50 against the proper fractional marking to adjust the cutter 16 with great precision. Once zeroed, the garter spring 48 remains angularly fixed with respect to the housing 10 even though it may be raised during adjustment of the base 18. The spring 48 is also most convenient for permitting rough adjustments of the base 18 in that it is free to be slid axially of the housing 10 in a ready fashion.

Having thus described our invention, what we claim as novel and desire to secure by Letters Patent of the United States is:

1. A router comprising a power unit having a circular motor housing on which is formed a thread along a substantial length of the housing, said thread having a relatively low helix angle and a pitch in excess of the thread height, a power shaft extending from one end of the housing for attachment of a cutter thereto, positioning means comprising a sleeve embracing said threaded housing and a workpiece guide adjacent said cutter, and a thread engaging member slidably mounted in said sleeve and spring means yieldably holding said member in for engagement with said thread whereby the sleeve may be slid axially of the housing for rough adjustment of the work guide and rotated about said thread for fine accurate adjustment.

2. A router as in claim 1 wherein the pitch of the thread is an even fractional dimension and the bottom of the thread is round.

3. A router as in claim 1 wherein the thread engaging member comprises a ball and the spring means comprises a compression spring adjustably forced against said ball by a back up screw, and wherein the sleeve is split and means are provided for clamping it in an adjusted position on the housing.

4. A router comprising a power unit having a circular motor housing on which is formed a thread along a substantial length of the housing, said thread having a relatively low helix angle, a power shaft extending from one end of the housing and having a cutter secured thereto, a split sleeve embracing said threaded housing and having a workpiece guide adjacent said cutter, a spring urged ball carried by said sleeve for engagement with said thread whereby the sleeve may be slid axially of the housing for rough adjustment of the work guide and rotated about said thread for fine accurate adjustment, said sleeve having a pointer at its upper end and indicia bearing means slidable and rotatable on said motor housing imediately above said pointer.

5. A router as in claim 4 wherein the indicia bearing means takes the form of a garter spring.

References Cited in the file of this patent

UNITED STATES PATENTS

| | | |
|---|---|---|
| 1,532,683 | Carter | Apr. 7, 1925 |
| 1,565,790 | Carter | Dec. 15, 1925 |
| 1,745,780 | Casey | Feb. 4, 1930 |
| 1,899,883 | Sacrey | Feb. 28, 1933 |
| 2,562,143 | Godfrey et al. | July 24, 1951 |
| 2,613,704 | Sacrey | Oct. 14, 1952 |
| 2,756,785 | Godfrey | July 31, 1956 |